US011386621B2

(12) United States Patent
Abdoo et al.

(10) Patent No.: US 11,386,621 B2
(45) Date of Patent: Jul. 12, 2022

(54) AUGMENTED REALITY FEEDBACK OF INVENTORY FOR AN APPLIANCE

(71) Applicant: WHIRLPOOL CORPORATION, Benton Harbor, MI (US)

(72) Inventors: Joshua George Abdoo, Stevensville, MI (US); Matthew P. Ebrom, Holland, MI (US); Neomar Giacomini, St. Joseph, MI (US); Donald J. Gilmore, Berrien Springs, MI (US); Brian N. Radford, Stevensville, MI (US); Aaron Edward Showers, St. Joseph, MI (US); Collin Andrew Stipe, West Unity, OH (US)

(73) Assignee: Whirlpool Corporation, Benton Harbor, MI (US)

( * ) Notice: Subject to any disclaimer, the term of this patent is extended or adjusted under 35 U.S.C. 154(b) by 32 days.

(21) Appl. No.: 16/237,066

(22) Filed: Dec. 31, 2018

(65) Prior Publication Data
US 2020/0211285 A1 Jul. 2, 2020

(51) Int. Cl.
*G06T 7/00* (2017.01)
*F25D 29/00* (2006.01)
*G06T 11/60* (2006.01)
*G06T 19/00* (2011.01)
*G06F 16/903* (2019.01)
(Continued)

(52) U.S. Cl.
CPC ............ *G06T 19/006* (2013.01); *F25D 29/00* (2013.01); *G06F 16/9038* (2019.01); *G06F 16/90335* (2019.01); *G06V 20/20* (2022.01); *G06V 20/68* (2022.01); *F25D 2400/361* (2013.01); *F25D 2700/06* (2013.01); *G06T 2207/30128* (2013.01); *G06T 2219/004* (2013.01)

(58) Field of Classification Search
CPC ............ F25D 23/028; F25D 2400/361; F25D 2500/06; F25D 2700/06; F25D 29/00; G06F 16/90335; G06F 16/9038; G06F 3/04842; G06T 2219/004; G06T 19/006; G06T 2200/24; G06T 11/206; G06Q 30/0643; G06K 2209/17; G06K 9/00671; G06K 9/00771
See application file for complete search history.

(56) References Cited

U.S. PATENT DOCUMENTS 5,689,446 A 11/1997 Sundman et al.
6,513,017 B1 1/2003 Howard et al.
(Continued)

FOREIGN PATENT DOCUMENTS

DE 102010002171 A1 8/2011
DE 102014006059 A1 3/2015
(Continued)

*Primary Examiner* — Jin Cheng Wang
(74) *Attorney, Agent, or Firm* — Price Heneveld LLP

(57) ABSTRACT

A food storage system is disclosed. The can system comprises an appliance having a cabinet defining an interior, the interior comprising at least one of a shelf, compartment, or drawer configured to store at least one food item, a vision system comprising at least one imager configured to record image data related to the at least one food item stored within the interior, and a controller in communication with the vision system. The controller can be operable to generate an augmented reality representation of the interior.

8 Claims, 9 Drawing Sheets

(51) Int. Cl.
*G06F 16/9038* (2019.01)
*G06V 20/20* (2022.01)
*G06V 20/68* (2022.01)

(56) References Cited

U.S. PATENT DOCUMENTS

| | | | |
|---|---|---|---|
| 7,444,001 B2 | 10/2008 | Roberts et al. | |
| 7,930,221 B2 | 4/2011 | Brown et al. | |
| 9,353,990 B2 * | 5/2016 | Kim | G05B 15/02 |
| 9,412,086 B2 | 8/2016 | Morse et al. | |
| 9,497,346 B2 | 11/2016 | Baba | |
| 9,791,936 B1 | 10/2017 | Kovach | |
| 10,224,007 B2 * | 3/2019 | Lee | G06T 11/60 |
| 2002/0066279 A1 | 6/2002 | Kiyomatsu | |
| 2002/0198795 A1 | 12/2002 | Dorenbosch | |
| 2006/0123806 A1 | 6/2006 | Vassilev et al. | |
| 2007/0222554 A1 | 9/2007 | Hart | |
| 2008/0048954 A1 * | 2/2008 | Lee | F25D 29/00 345/82 |
| 2011/0246276 A1 * | 10/2011 | Peters | G06Q 30/02 705/14.24 |
| 2012/0127284 A1 * | 5/2012 | Bar-Zeev | G02B 27/017 348/53 |
| 2012/0217254 A1 * | 8/2012 | Cho | F25D 29/00 220/592.02 |
| 2012/0260683 A1 * | 10/2012 | Cheon | F25D 29/00 62/125 |
| 2012/0286638 A1 * | 11/2012 | Lee | F25D 23/02 312/405 |
| 2013/0067375 A1 * | 3/2013 | Kim | G05F 1/66 715/769 |
| 2013/0229508 A1 | 9/2013 | Li et al. | |
| 2013/0257748 A1 | 10/2013 | Ambrus et al. | |
| 2013/0257858 A1 | 10/2013 | Na et al. | |
| 2014/0006131 A1 | 1/2014 | Causey et al. | |
| 2014/0043433 A1 * | 2/2014 | Scavezze | G06T 19/006 348/42 |
| 2014/0184046 A1 * | 7/2014 | Park | F25D 29/00 312/234 |
| 2014/0214547 A1 | 7/2014 | Signorelli et al. | |
| 2014/0293060 A1 * | 10/2014 | Ryu | F25D 29/00 348/159 |
| 2014/0320647 A1 * | 10/2014 | Seo | F25D 29/00 348/143 |
| 2015/0002388 A1 | 1/2015 | Weston et al. | |
| 2015/0196805 A1 | 7/2015 | Koduri et al. | |
| 2015/0228253 A1 * | 8/2015 | Lee | G09G 5/30 345/592 |
| 2015/0253873 A1 | 9/2015 | Sato et al. | |
| 2015/0276302 A1 * | 10/2015 | Roh | G02F 1/133377 62/56 |
| 2016/0116891 A1 | 4/2016 | Megger et al. | |
| 2016/0189286 A1 * | 6/2016 | Zohar | G06K 9/00355 348/150 |
| 2016/0239179 A1 * | 8/2016 | Kim | G06F 3/0486 |
| 2016/0358508 A1 | 12/2016 | Cheatham, III et al. | |
| 2017/0038924 A1 * | 2/2017 | Okuma | G06F 3/04847 |
| 2017/0053516 A1 * | 2/2017 | Wu | G08B 21/182 |
| 2017/0071573 A1 | 3/2017 | Takahashi | |
| 2017/0155775 A1 | 6/2017 | Sumioka | |
| 2017/0205138 A1 * | 7/2017 | Hwang | F25D 25/024 |
| 2017/0208213 A1 | 7/2017 | Miyoshi | |
| 2017/0219279 A1 * | 8/2017 | Chae | F25D 29/005 |
| 2017/0371405 A1 | 12/2017 | Kwon et al. | |
| 2018/0011674 A1 * | 1/2018 | Yoo | G06F 3/03547 |
| 2018/0137462 A1 * | 5/2018 | Zohar | G06Q 10/0875 |
| 2018/0150685 A1 | 5/2018 | Ebrom et al. | |
| 2018/0187943 A1 * | 7/2018 | Woo | F25D 11/02 |
| 2018/0196401 A1 * | 7/2018 | Lagares-Greenblatt | G06Q 50/00 |
| 2018/0335252 A1 * | 11/2018 | Oh | G06K 9/6256 |
| 2019/0226755 A1 * | 7/2019 | Johnston | G06T 7/13 |
| 2019/0249485 A1 * | 8/2019 | Jeong | F25D 27/005 |
| 2019/0384990 A1 * | 12/2019 | Kim | G06K 9/54 |
| 2020/0088463 A1 * | 3/2020 | Jeong | G06F 3/167 |
| 2020/0195890 A1 * | 6/2020 | Kim | H04N 5/225 |
| 2021/0048242 A1 * | 2/2021 | Kim | G06F 9/453 |
| 2021/0190416 A1 * | 6/2021 | Ge | F25D 29/00 |

FOREIGN PATENT DOCUMENTS

| | | |
|---|---|---|
| EP | 3330890 A1 | 6/2018 |
| KR | 2018004265 A | 3/2018 |
| KR | 20180024654 A | 3/2018 |
| WO | 2013016803 A1 | 2/2013 |
| WO | 2013023951 A1 | 2/2013 |
| WO | 2016202542 A2 | 12/2016 |
| WO | 2017076764 A1 | 5/2017 |
| WO | 2017160499 A2 | 9/2017 |
| WO | 2017223298 A2 | 12/2017 |

\* cited by examiner

AUGMENTED REALITY FEEDBACK OF INVENTORY FOR AN APPLIANCE

TECHNOLOGICAL FIELD

The present device generally relates to a food storage system and, more particularly, relates to a food storage system for an appliance.

SUMMARY

In at least one aspect, a food storage system is disclosed. The system can comprise an appliance having a cabinet defining an interior, the interior comprising at least one of a shelf, compartment, or drawer configured to store at least one food item, a vision system comprising at least one imager configured to record image data related to the at least one food item stored within the interior, and a controller in communication with the vision system. The controller can be operable to determine an identity of the least one food item, determine a storage configuration of the interior, generate an augmented reality representation of the interior based on the determined identity of the at least one food item and the storage configuration of the interior, and display the augmented reality representation. The augmented reality representation can comprise a digital rendering of the storage configuration and a digital food item representation corresponding to the at least one food item arranged within the digital rendering.

In at least another aspect, a food storage system is disclosed. The system can comprise an appliance having a cabinet defining an interior, the interior comprising at least one of a shelf, compartment, or drawer configured to store at least one food item, a vision system comprising at least one imager configured to record image data related to the at least one food item stored within the interior, a lighting system comprising at least one light source configured to project a pattern of light, and a controller in communication with the vision system. The controller can be operable to determine an identity and a location of the at least one food item, analyze a query from a user regarding the at least one food item, and control the lighting system to project a pattern of light onto the at least one food item in response to the query. The pattern of light can provide feedback to the user indicating at least one of a location or a food item property of the at least one food item.

In at least another aspect, a food storage system is disclosed. The system can comprise an appliance having a cabinet defining an interior, the interior comprising at least one of a shelf, compartment, or drawer configured to store at least one food item, a vision system comprising at least one imager configured to record image data related to the at least one food item stored within the interior, and a controller in communication with the vision system. The controller can be operable to detect at least one food item property for the at least one food item, generate an augmented reality representation of the interior based on a user selection of a food item property, and display the augmented reality representation. The augmented reality representation can comprise at least one digital food item overlay corresponding to the food item property.

These and other features, advantages, and objects of the present device will be further understood and appreciated by those skilled in the art upon studying the following specification, claims, and appended drawings.

DETAILED DESCRIPTION OF EMBODIMENTS

Figure 1:
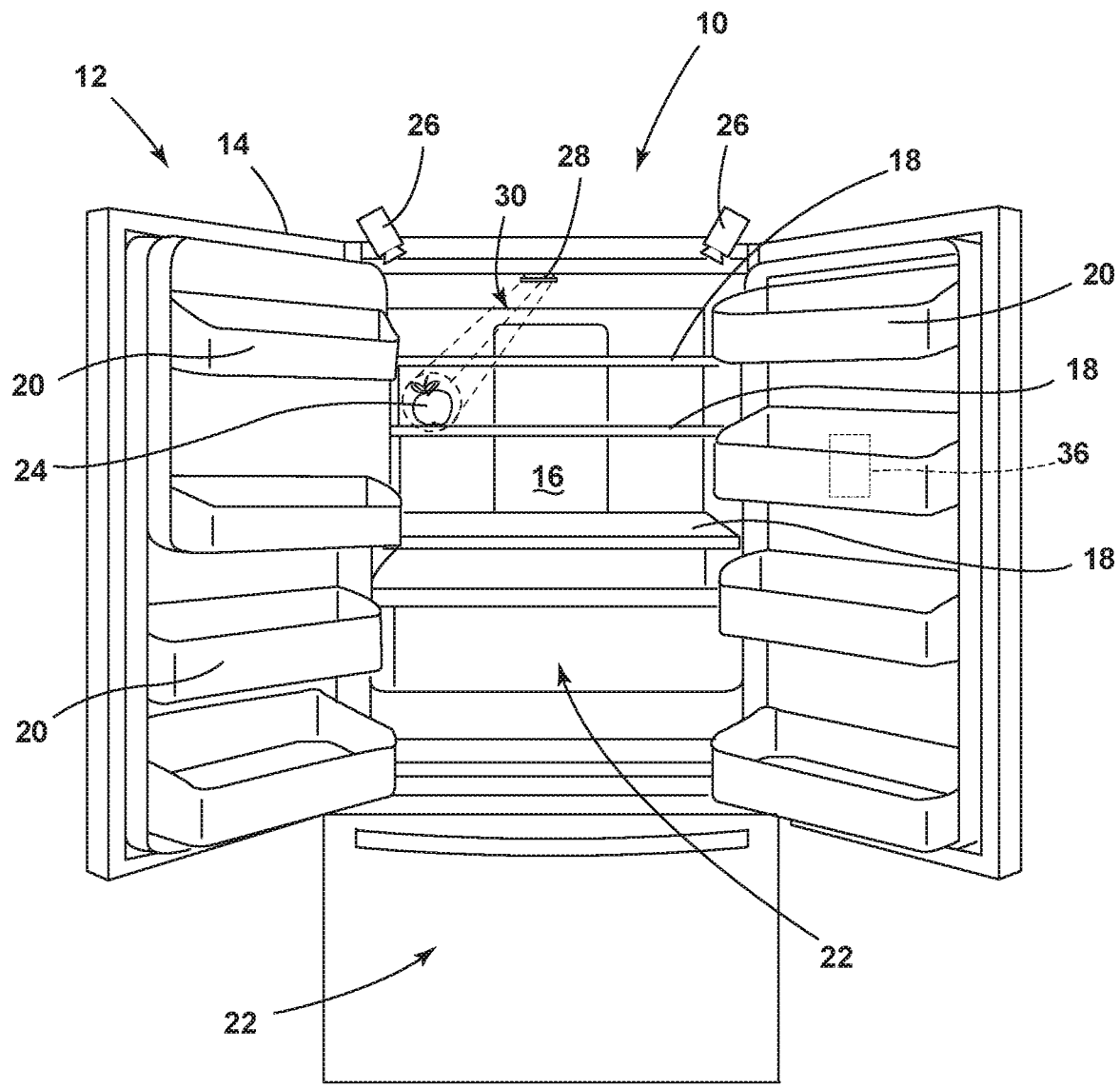
FIG. 1 is a front view of an appliance interior comprising a food storage system according to various aspects described herein.

For purposes of description herein, the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIG. 1, a storage system 10 for an appliance 12, such as a refrigerator, is shown. The appliance 12 can include a cabinet 14 defining an interior 16. The cabinet may include a display screen 36, which can be a LCD or any suitable display. The display screen 36 may be in the form of a user interface. The interior 16 may include a plurality of holders defining a storage configuration to store at least one item 24, which may include a food item 24. The holders may in include at least one of a shelf 18, compartment 20, or drawer 22 and any combination thereof. While the interior 16 is shown to include a combination of shelves 18, compartments 20, and drawers 22, it is not limited to these storage configurations and may include any suitable structure for storing a food item 24. Furthermore, the interior 16 may include a lighting system including at least one light source 28. The at least one light source 28 may be configured to provide selective lighting, such as a pattern of light 30, and may be in the form of any suitable light source 28, such as a micro projector, a laser, and the like.

The storage system 10 may be configured to recognize and track a status of the item 24 stored within the appliance 12. The specific status of the item 24 tracked or updated by the system 10 may vary depending on the nature of the appliance 12. Accordingly, the disclosure may provide for a storage system 10 that may be utilized to recognize the status of an item, inventory of an item, and/or various processing states to gather and track various information as discussed herein.

For example, if the appliance 12 corresponds to a refrigerator, as illustrated in FIG. 1, the system 10 may be configured to track an inventory of the food item 24 as it is added or removed from the interior 16. In order to detect and identify the food item 24, the storage system 10 may comprise a vision system including at least one imager 26. In some embodiments, the at least one imager 26 may correspond to a plurality of imagers 26. The at least one imager 26 may be configured to capture image data in the interior 16 or in an access region external to the appliance 12. The storage system 10 may be operable to detect the food item 24 in connection with at least one part of a person's body (e.g. a hand) in connection with the food item 24 entering and/or exiting the interior 16 via the access region. In this way, the system 10 may be operable to track the status of the food item 24 by detecting the part of the person's body as it enters and exits the access region. A system operable to track the status of a food item by detecting part of a person's body as it enters and exits the access region may include the system disclosed in U.S. Pat. No. 10,157,308, issued Dec. 18, 2018, entitled "Interaction Recognition and Analysis System," which is herein incorporated by reference in full. U.S. Pat. No. 10,157,308 discloses an object tracking system configured to track an inventory of the object as it is added or removed from an operating volume of a refrigerator.

The vision system may further include one or more infrared (IR) cameras, or sensors. An infrared camera may be incorporated into the system 10 in order to detect a temperature of a food item 24 or the temperature of various locations within the interior 16 of the appliance 12.

The item 24 may generally correspond to any form of object that may be stored, processed, disposed of, or otherwise utilized in connection with an appliance 12. As previously discussed, the item 24 may correspond to a food item 24, or product, that may be stored in the interior 16 of the refrigerator 12. The system 10 may process image data captured by the at least one imager 26 in order to identify a product type and proportion or quantity by utilizing various imaging processing techniques. With the product type and quantity identified for the food item 24, the system 10 may update an inventory status of the product type and quantity of the food item 24 in a memory or inventory database. Though discussed in reference to an inventory status, the system 10 may be configured to detect various forms of information in reference to the food item 24, which may include, but are not limited to, a depletion or usage, a location, a quality status (e.g. the presence of mold), a color or consistency, and/or various additional information that may be derived from the image data.

In some embodiments, the system 10 may be operable to track various forms of information regarding the status and characteristics of the food item 24. As discussed herein, such information may be inferred by the system 10 based on a process completed by the appliance 12 and/or a duration of time between a first detection of the food item 24 and a second detection of the food item 24 (e.g. a time between removal and placement of the object in the operating volume, or interior 16). Such information may include clock and calendar data for inventory and quality tracking of the food item 24. A status or characteristic of the food item 24 may also be inferred by monitoring of depletion, or fill level, of the food item 24. Additionally, the status of the food item 24 may be indicated based on actions taken on the object including, but not limited to, wrapping the food item 24, opening a package containing the object, covering a surface or container of the object, etc.

Based on the image data, the system 10 may identify the food item 24. Details regarding image processing techniques that may be utilized to identify various food items 24 and corresponding states of such food items 24 are further discussed in reference to FIGS. 7A and 7B. The identification of the food item 24 may include an indication of a type or category to which the food item 24 belongs and a proportion or quantity of the food item 24. The system 10 may further identify additional information about the food item 24, including, but not limited to, a color, a texture, a storage data, a location, and various additional information. In some embodiments, the system 10 may classify the food item 24 into classes and subclasses. For example, in the case where the food item 24 is a food product, the system 10 can determine a class of the food item 24 as a beverage, a protein, a fruit, a vegetable, a packaged industrial food, a dressing, and the like. A subclass of a beverage may include a can, a bottle, a box, and the like, while a subclass of a protein may include a type, such as chicken, beef, fish, a state, such as frozen or fresh, and/or a size.

The system 10 may be operable to detect and update the status of the food item 24 based on a variety of properties and/or characteristics that may be identified in the image data received from the imager 26. For example, as previously discussed, an identification of the food item 24 within the interior 16, or in connection with the hand being inserted or removed from the operating volume 20 of the refrigerator 18 may be utilized by the system 10 to update an inventory of the food item 24. The system 10 may track a variety of properties and/or characteristics corresponding to the food item 24 based on the image data captured by the imager 26.

For example, the system 10 may detect an identity, color, surface texture, quantity, fill level, proportion, or any form of information that may be visually and/or thermally detected by the system 10 based on the image data received from the imager 26. The system 10 may draw various inferences regarding the status of the food item 24 based on the image data. In some scenarios, the system 10 may also infer information about the food item 24 based on a duration of time that the object is detected as being removed from the interior 16.

Accordingly, a controller of the system 10 may be in communication with an appliance control system to determine a food item property for the food item 24 based on one or more properties and/or characteristics identified from the image data. The controller of the system 10 may be configured to identify the food item 24 by utilizing an object identification module and determine the appropriate food item property. Furthermore, based on identification of the food item 24 in the image data captured by the imager 26, the system 10 may update a usage or inventory of the food item 24 as being consumed or depleted. A food item property can be in the form of a fill level, an expiration date, a favorite, a recipe, a quantity, a brand, a condition, a placement, a name, a type, and the like, relating to the food item 24. An object detection module may detect the location food item 24.

Figure 2:
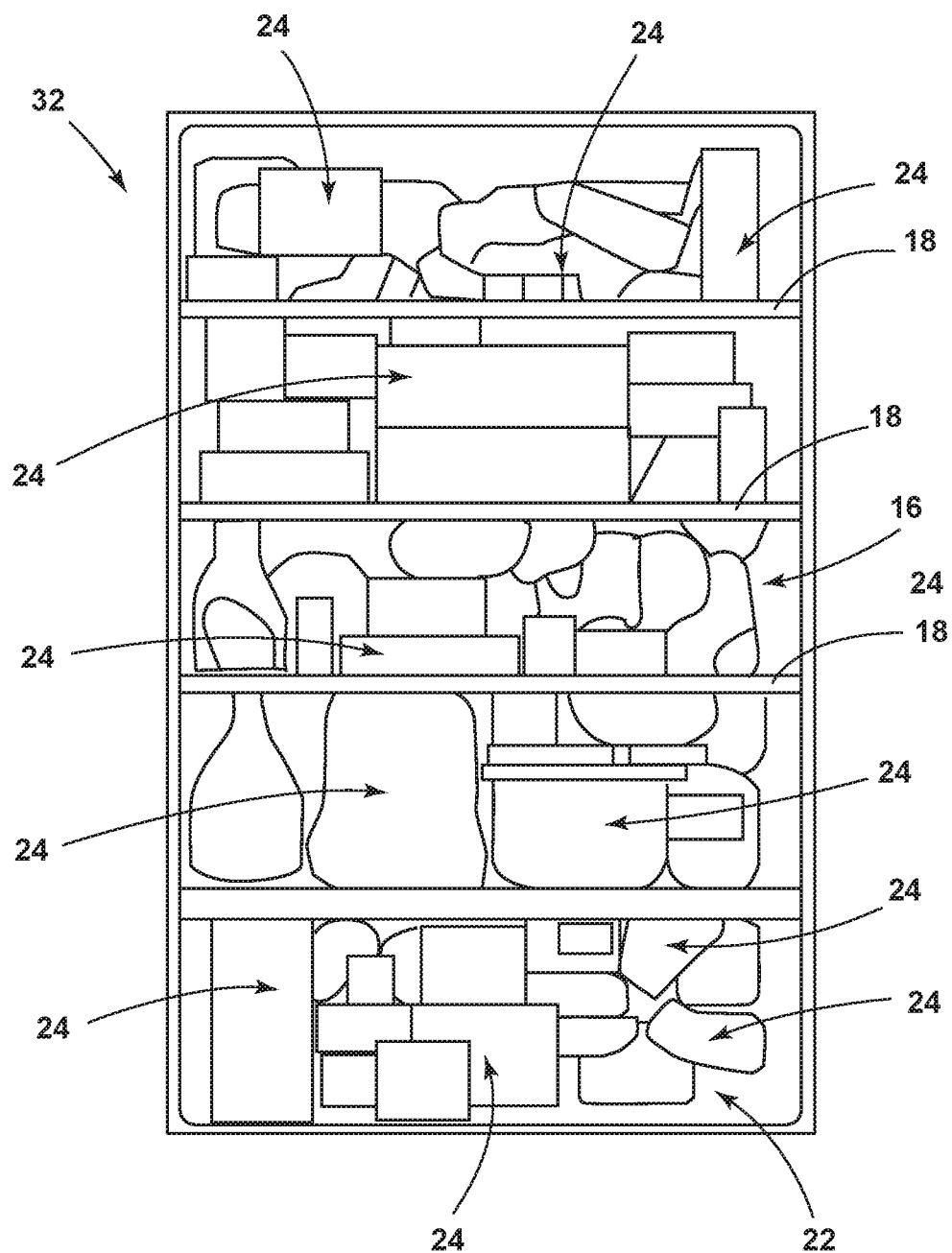
FIG. 2 is a schematic view of a portion an interior of an appliance according to various aspects described herein.

FIG. 2 illustrates a portion of the interior 16 of the appliance 12. The system 10 may be configured to determine a storage configuration 32 of the interior 16. The storage configuration 32 can include the relative location of different food items 24 to one another, which can be tracked to create a full view of how food items 24 are stored in the appliance 12, or refrigerator. Additionally, the system 10 can determine the location, identity, and size of the holders, such as the shelves 18, compartments 20, or drawers 22, to further create the full view of the storage configuration 32. In some examples, the storage configuration 32 of the appliance 12 can be cluttered with many food items 24, such that a user viewing the interior 16 in real-time, or via a display (e.g. a mobile display) in communication with the vision system, may consider the interior 16 to be chaotic and messy.

In some examples, the system 10 can track and monitor the location, identity, and size of the food item 24 holders by way of a 3-Dimensional coordinate system within the interior 16. The system 10 may determine a unique set of coordinates for each shelf 18, compartment 20, drawer 22, etc. located within the interior 16. The set of coordinates may define the storage configuration 32. Furthermore, the coordinates may be stored in a memory, or library, such that the system 10 can refer to the coordinates as needed.

Figure 3:
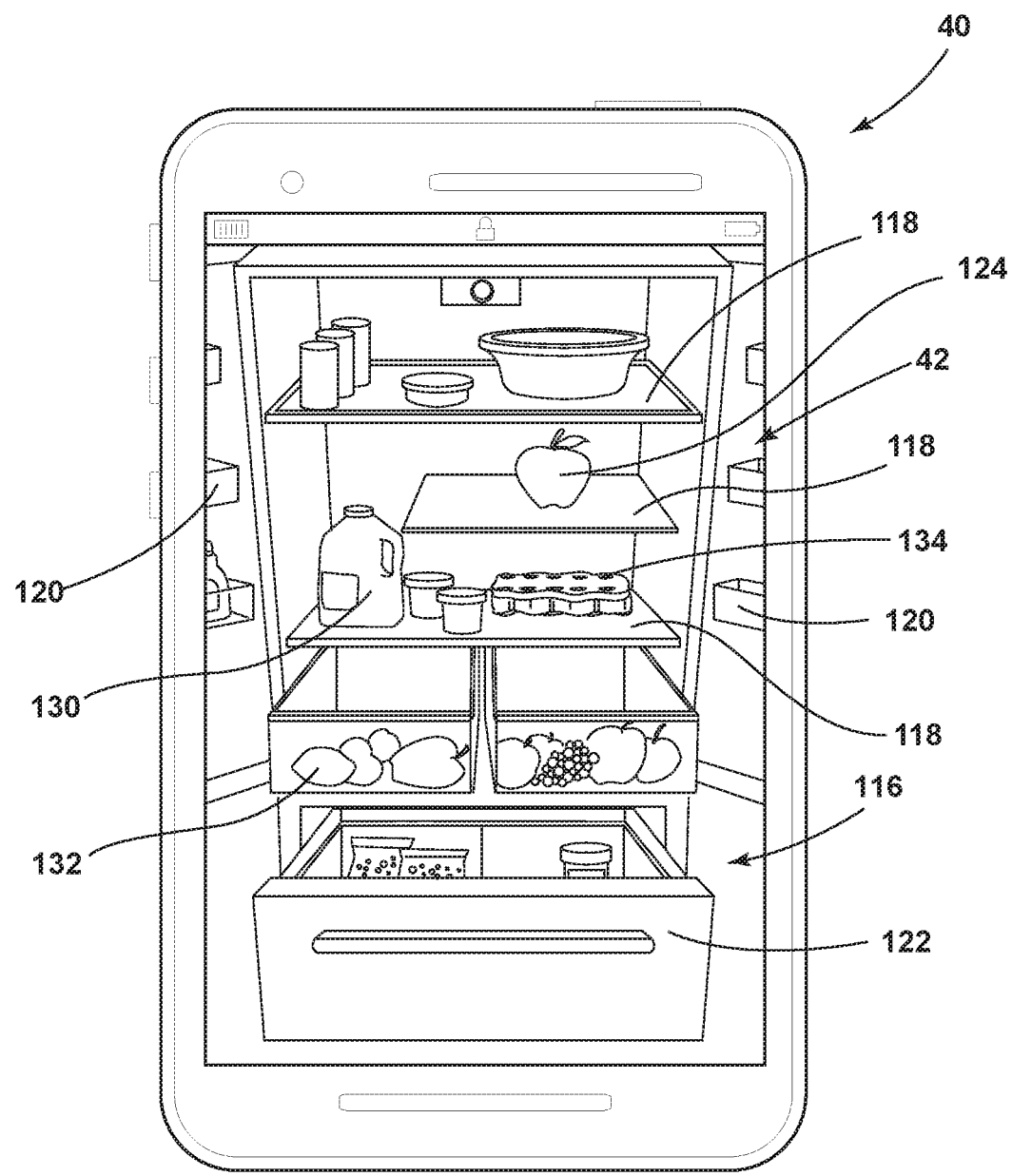
FIG. 3 is a schematic view of an augmented reality representation of an appliance interior according to various aspects described herein.

The system 10 can be configured to provide an augmented reality view of the interior 16 in order to "clean-up", or organize, the view for the user on a display, such as a mobile device display or the appliance user interface, or display 36 (FIG. 1), but is not limited to such. An augmented reality view can be in the form of an interactive experience of the real-word interior 16 of the appliance 12 where the storage configuration 32 and the food items 24 are "augmented" or "enhanced" by data provided by the system 10. Turning to FIG. 3, a mobile device 41 includes a display 42 on which a user can view an interior rendering 116 of the appliance 12 interior 16. In this way, the interior rendering 116 is organized and more easily viewable than the interior 16 shown in FIG. 2. Thus, a user may avoid "hunting" for food items 24 within the interior 16.

The interior rendering 116 can be in the form of a digital rendering of the storage configuration 32 (FIG. 2) which may include at least one digital food item representation 124. The digital food item representation 124 may be in the form of a digital graphic, or graphical, image that corresponds to a food item 24. As shown in FIG. 3, the digital food item representation 124 corresponds to an apple stored on a digital representation of a shelf 118. The interior rendering 116 may further include digital food item representations of multiple food items, such as a carton of a gallon of milk 130, a lemon 132, and a carton of eggs 134, as well as a digital representation of the storage configuration 32 including digital representations of the shelves 118, compartments 120, and drawers 122, including size and relative positions. Digital food item representations may include default images of an identified food item 24, or images specific to a food item brand. Additionally, a digital food item representation 124 may include a single digital image for multiple identified food items 24. For example, if the system 10 identifies a total of six yogurts, the interior rendering 116 may include a single digital image paired with a number to indicate the number of yogurts (6).

The system 10 may be configured to provide the interior rendering 116 in more than one layer such that the user may view the contents of the interior 16 over more than one view. Viewing the contents of the interior in layers may provide feedback that is easily viewable by the user. In some examples, the user may view a layer that corresponds with a selection of a food item property. The food item property may be determined by the object identification and detection modules based on one or more properties, characteristics, and location of a food item 24.

Figure 4:
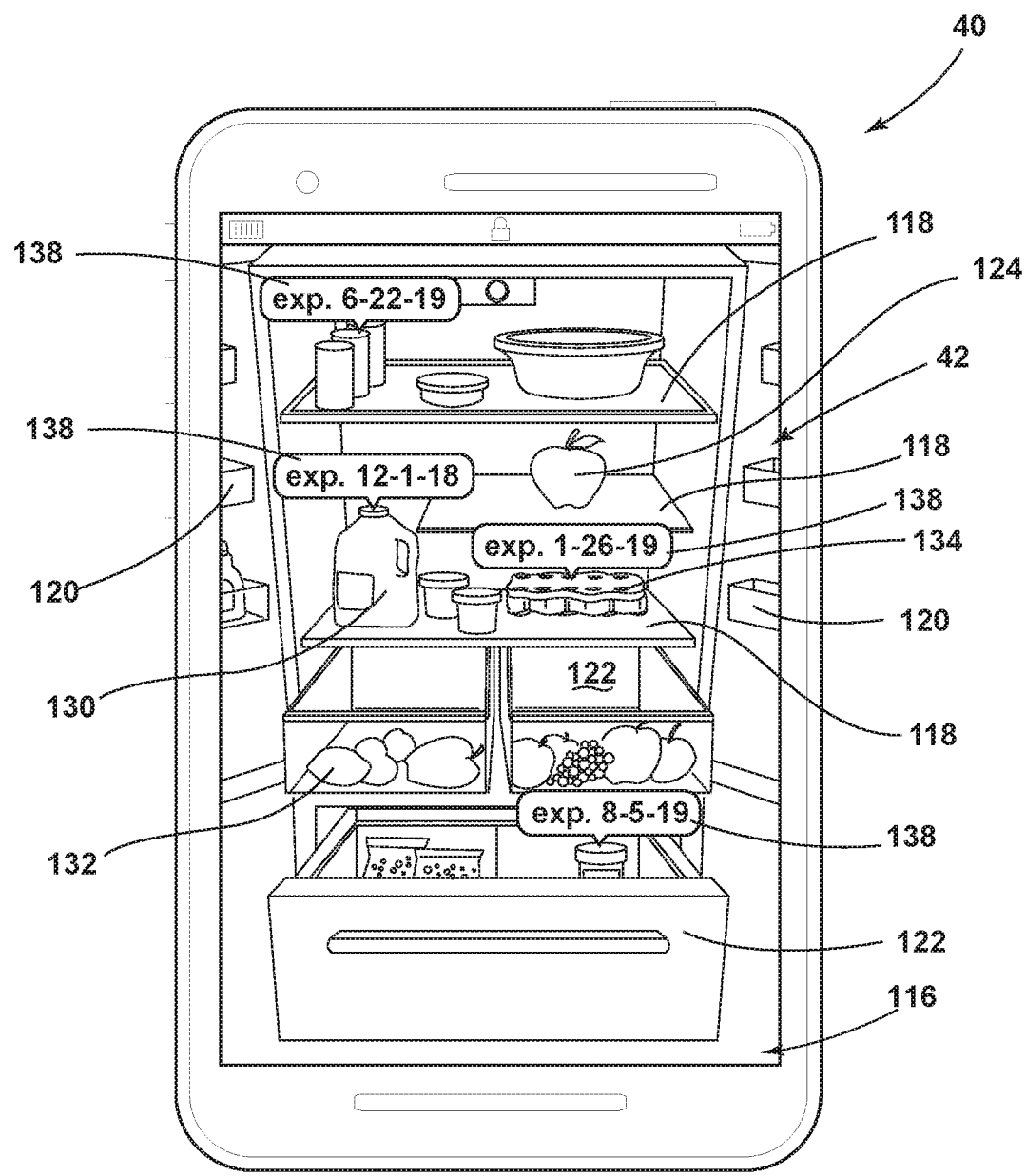
FIG. 4 is a schematic view of an augmented reality representation of an appliance interior according to various aspects described herein.

Turning to FIG. 4, in some examples, a user can select a food item property that corresponds to expiration dates of food items 24. The interior rendering 116 can include at least one digital food item overlay 138 that corresponds to the selected food item property. Thus, in the event that a user selects expiration dates as a food item property for viewing, the digital food item overlay 138 may be in the form of a digital tag 138 including the expiration date of each food item 24, which may also be represented by the digital food item representation 130. The expiration date of a food item 24 may be determined by any suitable method, such as a user input, or identified by the vision system.

Figure 5:
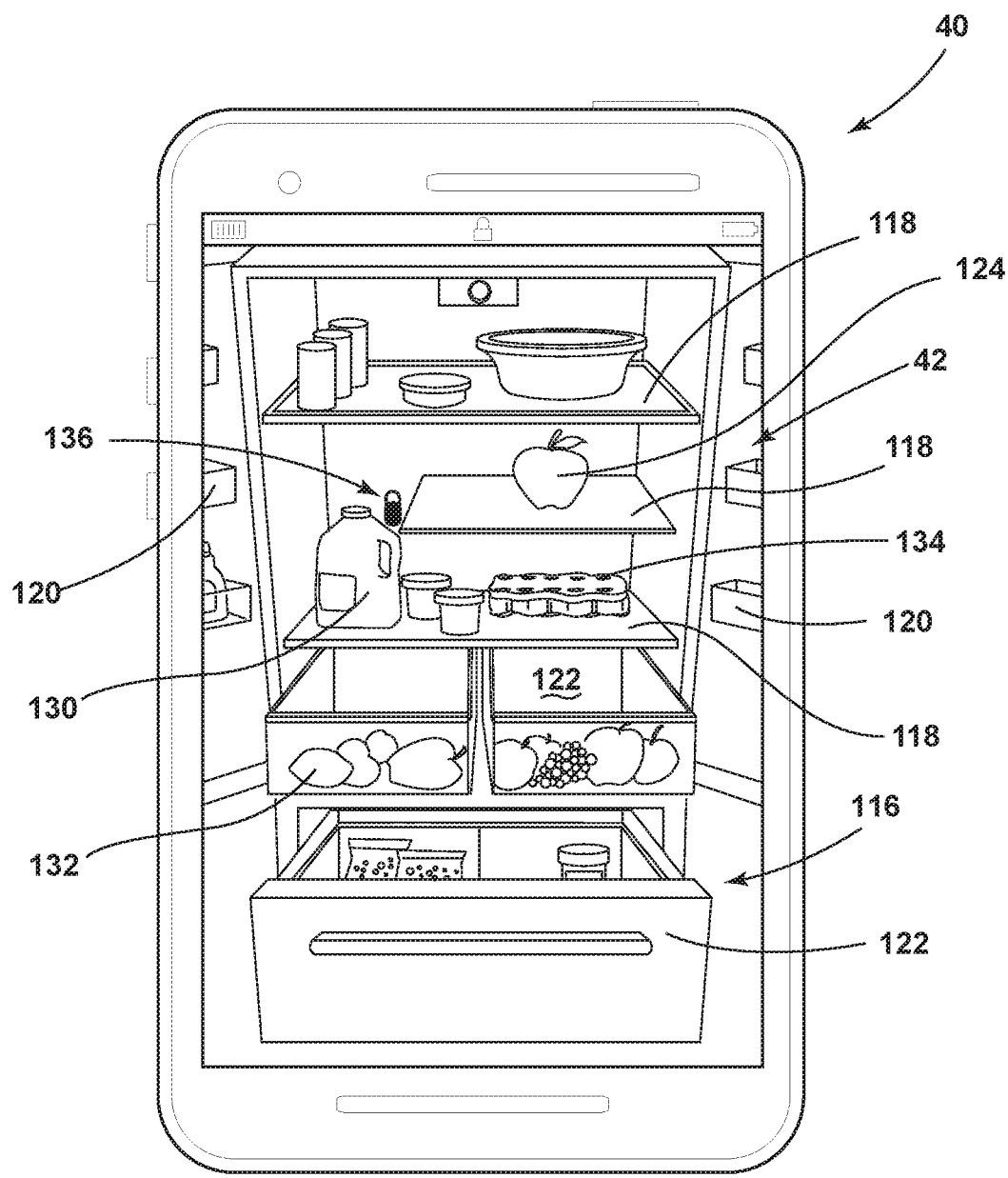
FIG. 5 is a schematic view of an augmented reality representation of an appliance interior according to various aspects described herein.

In another example, FIG. 5 illustrates the interior rendering 116 corresponding to a layer generated by a user selection of a fill level food item property. One or more digital fill level icons 136 can be displayed within the interior rendering 116 to indicate the fill level of a corresponding food item 24. The fill level icon 136 can be in the form of any digital image, or overlay, suitable to indicate an approximate fill level. For example, the fill level icon 136 may be positioned adjacent the gallon of milk, represented by the digital food item representation 130, and may include a level providing an approximate amount of milk remaining in the gallon container located within the interior 16 of the appliance 12. The fill level, or usage, of a food item 24 may be determined by any suitable method, such as a user input, or identified by the vision system.

Figure 6:
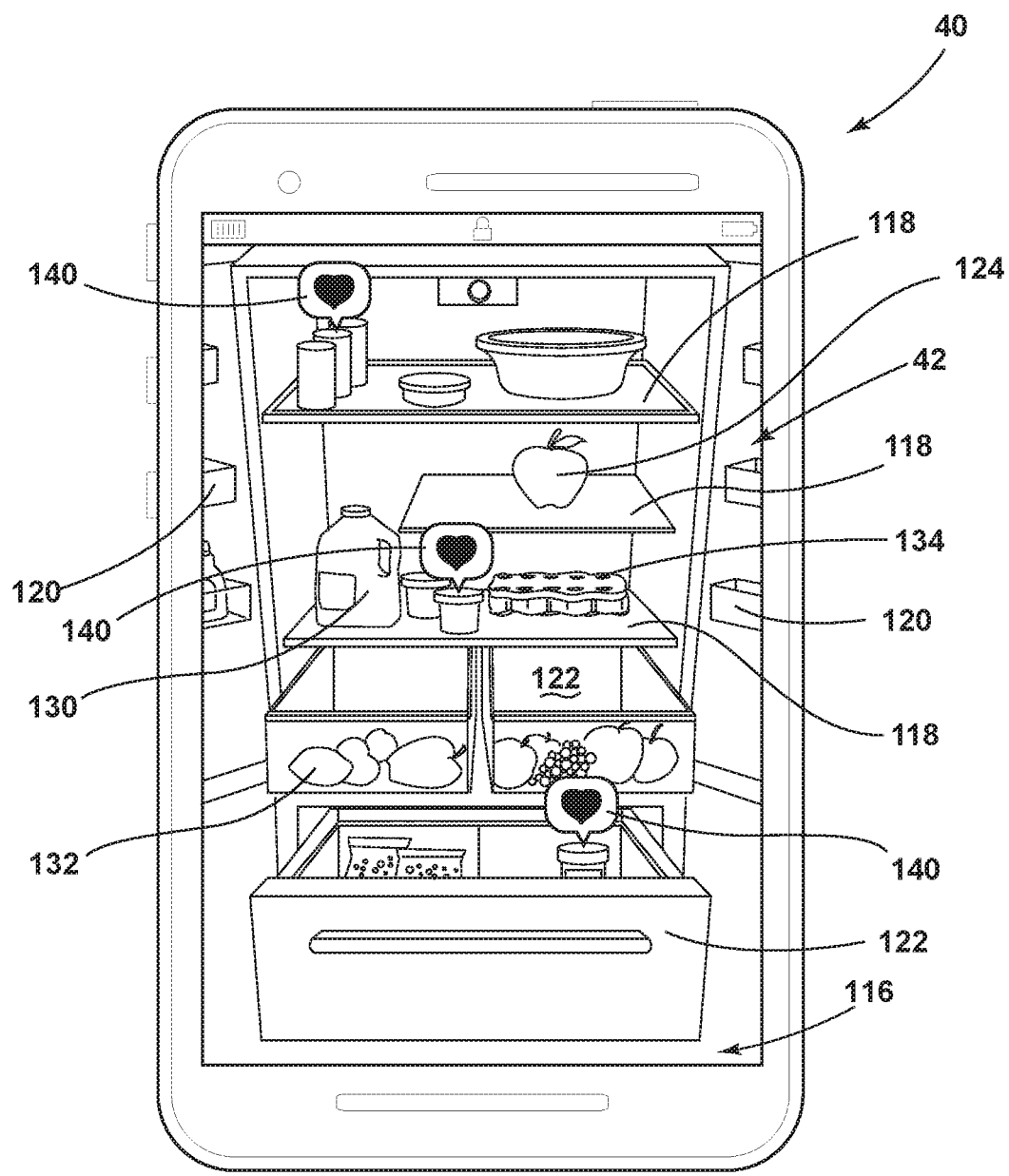
FIG. 6 is a schematic view of an augmented reality representation of an appliance interior according to various aspects described herein.

In yet another example, FIG. 6 illustrates the interior rendering 116 corresponding to a layer generated from a user selection of a user favorite's food item property. One or more digital favorite overlays 140 can be displayed within the interior rendering 116 to indicate that a specific food item 24 is a user favorite item. The digital favorite overlay 140 can be in the form of any digital image, overlay, or tag, suitable to indicate that a food item 24 is a favorite. For example, the digital favorite overlay 140 may be positioned adjacent a container of ice cream determined to be located within a freezer drawer indicated by the digital representation of the drawer 122, and may include a tag displaying a heart icon for indicating that a user's favorite item, such as ice cream, is available within the interior 16 of the appliance 12. The user favorite designation of a food item 24 may be determined by any suitable method, such as a user input, or identified by the vision system by user habits monitoring.

While food item properties selected by the user for augmented reality viewing generated by the system 10 have been described in relation to expiration dates, fill levels, and favorites corresponding to various food items 24, the system 10 can generate an interior representation 116 corresponding to food items 24 according to a variety of determined characteristics of the food item 24. In further examples, the system 10 can take into account the quality of the food item 24, recipes, quantities, etc. It is also possible that the user selects more than one food item property such that multiple food item properties are represented in a single layer, or interior rendering 116.

Figure 7A:
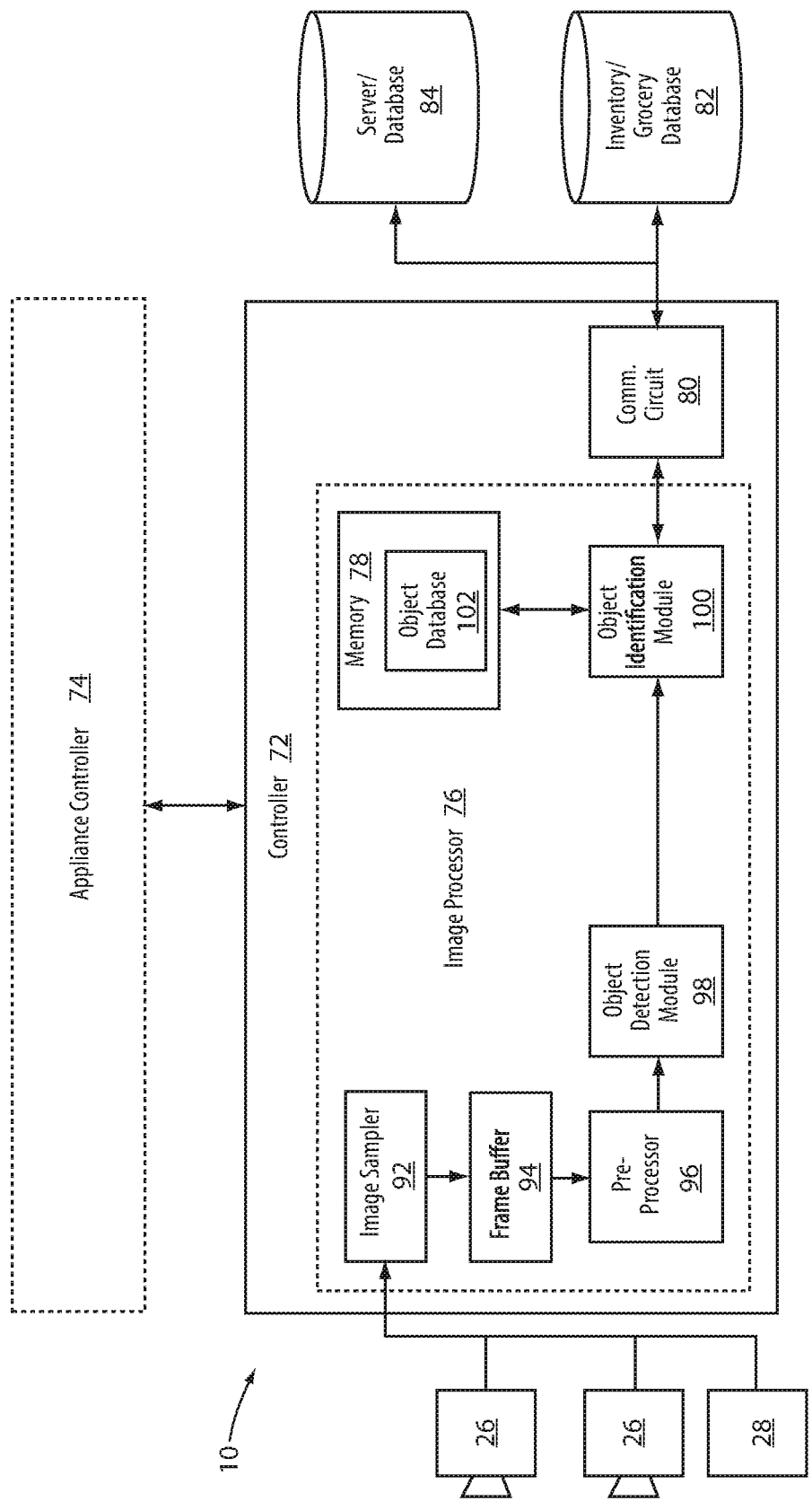
FIG. 7A is a block diagram of a food storage system according to various aspects described herein.
Figure 7B:
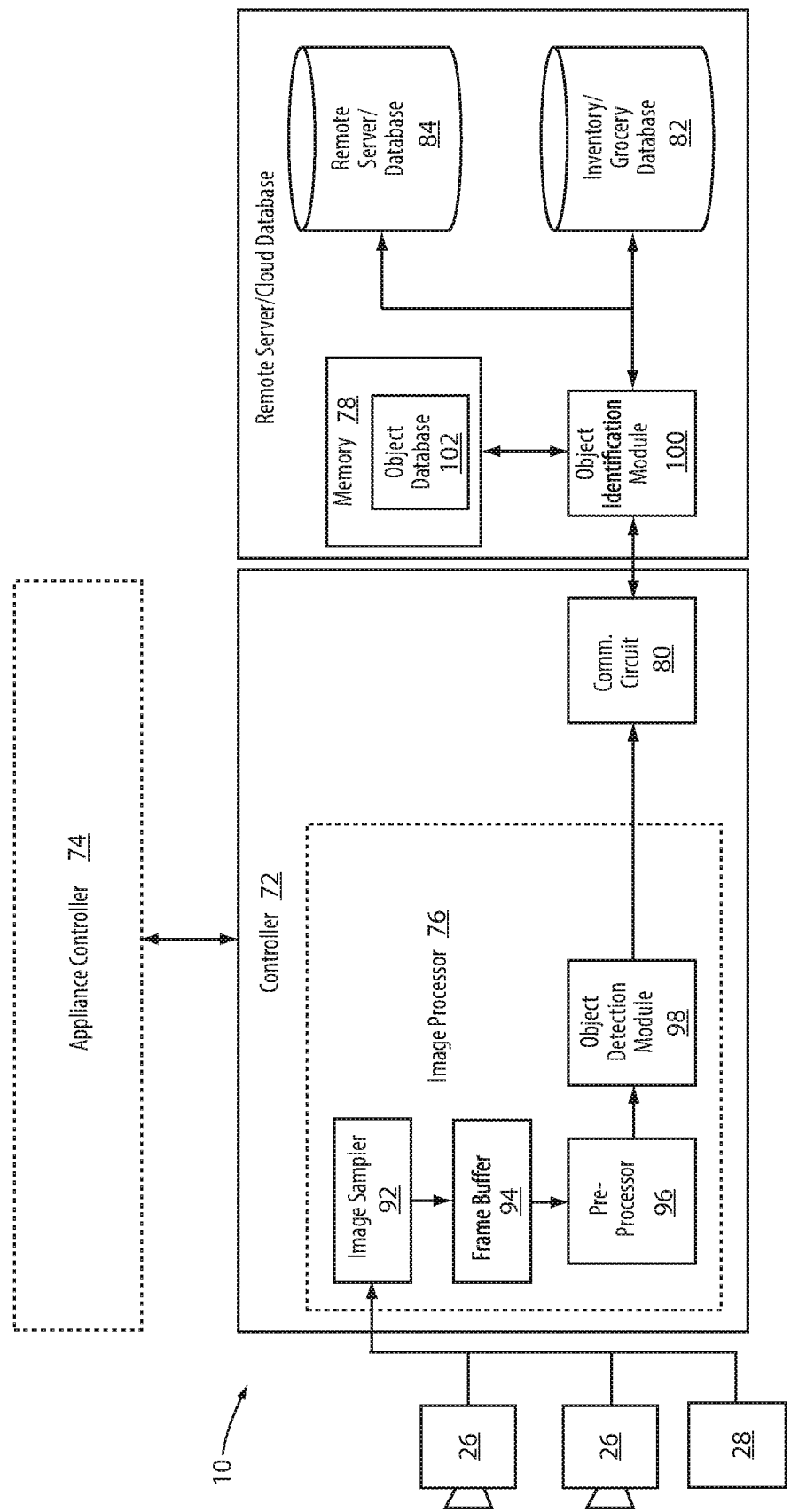
FIG. 7B is a block diagram of a food storage system according to various aspects described herein.

Referring now to FIGS. 7A and 7B, block diagrams of exemplary embodiments of the storage system 10 are shown. The system 10 may comprise a controller 72 which may be integrated with or in communication with an appliance controller 74. The controller 72 may comprise one or more processors and/or memory configured to complete the various processing steps and control procedures discussed herein. In an exemplary embodiment, the controller 72 may comprise an image processor 76 in communication with the at least one imager 26. The image processor 76 may correspond to one or more microprocessors, discrete logic controllers or a combination of analog and/or digital circuitry. The image processor 76 may comprise a memory 78 and a communication circuit 80.

The memory 78 may correspond to various forms of tangible or non-transitory machine-readable or computer-readable media. For example, the memory 78 may correspond to flash memory, random access memory (RAM), erasable programmable read only memory (EPROM), or other machine-readable media. The image processor 76 may store various image processing algorithms, control instructions, and additional information in the memory 78 to complete one or more of the processing tasks described herein.

The communication circuit 80 may correspond to a wired or wireless communication device through which the controller 72 may communicate with and/or access various forms of information. For example, the controller 72 may access or update an inventory or grocery database 82 via the communication circuit 80. The inventory or grocery database 82 may correspond to a remote or cloud-based storage that may be accessible by a variety of devices to access the inventory and/or grocery database information as described herein. Additionally, the communication circuit 80 may further be in communication with an additional remote server or database 84 from which controller software updates, object recognition information, algorithms, object libraries, recipe libraries, and various additional information for use with the system 10 may be accessed.

Though discussed in reference to remote or cloud-based databases, the databases 82 and/or 84 may also correspond to local storage provided in a memory of the controller 72. Additionally, in some embodiments, a portion of each of the databases 82 and 84 may be stored in the local memory while additional portions may be stored in the remote databases 82 and 84 in communication with the controller 72 via the communication circuit 80. The communication circuit 80 may utilize various forms of communication interfaces including, but not limited to, the following wireless communication protocols: 3G, 4G, Wi-Fi °, Wi-Max®, CDMA, GSM, and/or any suitable wireless communication protocol.

As discussed herein, the system 10 may be operable to complete various image processing and identification steps corresponding to the food item stored within the interior 16. Such detection, recognition, and/or identification may be completed by the image processor 76 by processing the image data received from the at least one imager 26. In order to process the image data, the image processor 76 may comprise a plurality of processing modules configured to improve or simplify the image data, and/or determine an identity of the food item 24. In this way, the image processor 76 may provide for the determination of the identity, quantity, and/or proportion of the food item 24.

In an exemplary embodiment, image processor 76 may comprise an image sampler 92.

The image sampler 92 may gather a sequence of image frames from the image data received from the at least one imager 26. The sequence of image frames may be temporarily stored in a frame buffer 94. From the frame buffer 94, the image data from the image frames may be retrieved by a pre-processor 96. The pre-processor 96 may process the sequence of image frames from the image data to enhance the contrast, adjust a rotation, correct a boundary, and/or scale or crop the image data. The pre-processor 96 may accomplish such steps by processing the image data with a variety of enhancement techniques, including, but not limited to, histogram equalization, image segmentation, filtering, etc.

Enhanced image data may be communicated from the pre-processor 96 to the object detection module 98. The object detection module 98 may process the enhanced image data corresponding to the location of one or more food items 24 as described herein. The image data may be communicated to an object identification module 100. The object identification module 100 may process the image data to determine an identity, type, category, proportion, and/or quantity of the food item 24.

The object identification module 100 may utilize a variety of scanning methods and/or algorithms to determine the identity of the food item 24. Such algorithms may include, but are not limited to, character recognition, feature extraction, clustering, pattern matching, neural network processing, optical character recognition (OCR), or various other recognition techniques. In some embodiments, the object identification module 100 may further be in communication with an object database 102. The object database 102 may comprise a library of features and/or characteristics for comparison to the enhanced image data by the object identification module 100 in order to determine the identity of the food item 24. In this way, the system 10 may be operable to determine the identity of the food item 24 as discussed herein.

Although the image processor 76 is demonstrated as being an integral component of the controller 72, the image processor 76 may correspond to a remote image processing system that may be in communication with the controller 72 via the communication circuit 80. In this way, the storage system 10 may communicate the image data to a remote image processor via the communication circuit 80 in order to determine the identity of the food item 24 with the object identification module 100. Upon determination of the identity of the food item 24 from the image data, the remote image processor may provide an indication of the identity and any other relevant information to the controller 72 via the communication circuit 80. Accordingly, though the storage system 10 is discussed in reference to specific examples, the functions described in reference to the system 10 may be completed in a variety of ways without departing from the spirit of the disclosure.

In some embodiments, the at least one imager 26 may correspond to a plurality of imaging devices or a stereoscopic imaging device. In this way, the image processor 76 may also be operable to determine a position and proximity of the food item 24 based on depth data gathered by the stereoscopic imaging devices. Such positional information of the food item 24 may be beneficial in identifying or distinguishing a location of the food item 24. Accordingly, the storage system 10 may correspond to a scalable system operable to suit a variety of applications. A stereoscopic system may also be used to estimate volume of a food item 24. In some embodiments, the at least one imager 26 may correspond to an infrared imaging device, thermal imaging device, or a combination of thermal and conventional imaging devices. The thermal imaging device may correspond to a focal plane array (FPA) utilizing microbolometers as FPA sensors. Accordingly, the image data captured by the system 10 may comprise thermal image data and/or conventional image data in the visible light spectrum. In some embodiments, the system 10 may be operable to distinguish between a plurality of objects having a like visual appearance in the image, but differing temperatures. For example, in some embodiments, the system 10 may be operable to track an inventory of an object that is removed from the interior 16 at a cold temperature and replaced in the operating volume at a warm temperature. Accordingly, by utilizing the thermal imaging data, the system 10 may be operable to distinguish additional status information for the food item 24.

Referring to FIGS. 1, 7A, and 7B, the controller 72 of the system 10 can be configured to determine a query, or input, from the user regarding the food item 24. A query from the user may be in the form of a gesture, a vocal communication, or any suitable haptic command. The controller 72 can be configured to determine a response to the query, which may be based on an identity or location of the food item 24. A response to the query may include a voice message, selective lighting, etc. Examples of selective lighting can include, but are not limited to, a pattern of light 30 (FIG. 1) including a light spot on the food item 24, a light color on the food item 24, or words or graphics generated by an arrangement of pixels, a pulsing light, dimming light, or lighting a specific zone of the interior 16.

In some examples, a user may query the system 10 with a query that includes a voice message inquiring about an optimal storage location for the food item 24, which may include, "Where do I store the butter"? The controller 72 may analyze the query and determine the response for guiding the user for storage of the food item 24. For example, the system 10 may then provide a pattern of light 30 that can include selective lighting of at least a portion of the appliance 12, such as a compartment 20, to provide an indication of the optimal storage location for the butter, or food item 24.

In another example, a user may query the system 10 with a query that includes a voice message inquiring about the location of a food item 24, which may include, "Where are my strawberries"? The controller 72 may analyze the query and determine the response for guiding the user to the location of the food item 24. For example, the system 10 may then provide a pattern of light 30 that can include a beam of light directed to the strawberries, or food item 24, to provide an indication of the location. The beam of light may include colors that correlate to a determined food item property, such as a quality of the food. In some examples, a red beam of light may indicate that the food item 24 has expired, or contains mold, while a green beam of light may indicate that the food item 24 is unexpired, or fresh.

In yet another example, a user may query the system 10 with a query that includes a voice message inquiring about available ingredients for a recipe, which may include, "What do I have for making a sandwich"? The controller may analyze the query and determine the response for providing feedback to the user regarding multiple food items 24 available for a recipe. For example, the system 10 may then provide a pattern of light 30 that can include a beam of light directed to each of the food items 24, which may include bread, meat, vegetables, and condiments stored within the interior 16 to provide an indication of available food items 24 for making a sandwich.

While responses by the system 10 have been described in relation to storage or recipes for the food item 24, the system 10 can determine responses to a user query regarding a food item 24 to provide assistance to the user using a variety of determined characteristics of the food item 24. In further examples, the system 10 can take into account the status of the food item 24, which can include a depletion/usage for the food item 24 and determine a fill level.

In some examples, a response can include a heat map of the interior 16 generated by the lighting system. The heat map can include lighting up the interior 16 according to variations in temperature that may correspond to variations in colored light. In some examples, the variations in colored light may indicate poor placement of food items 24. For example, placing yogurt towards the rear, or back, of the interior, can cause the yogurt to freeze. Poor placement may be indicated by red colored light, while optimal placement may be indicated by green colored light. Thus, the heat map may include multiple light projections, or beams throughout the interior 16. Additionally, variations in colored light may indicate issues, or messes within the interior 16. Messes may result from placing a large frozen mass, such as a frozen turkey, within the interior 16 where humidity may increase and lead to dripping. The heat map may indicate if dripping has occurred.

Figure 8:
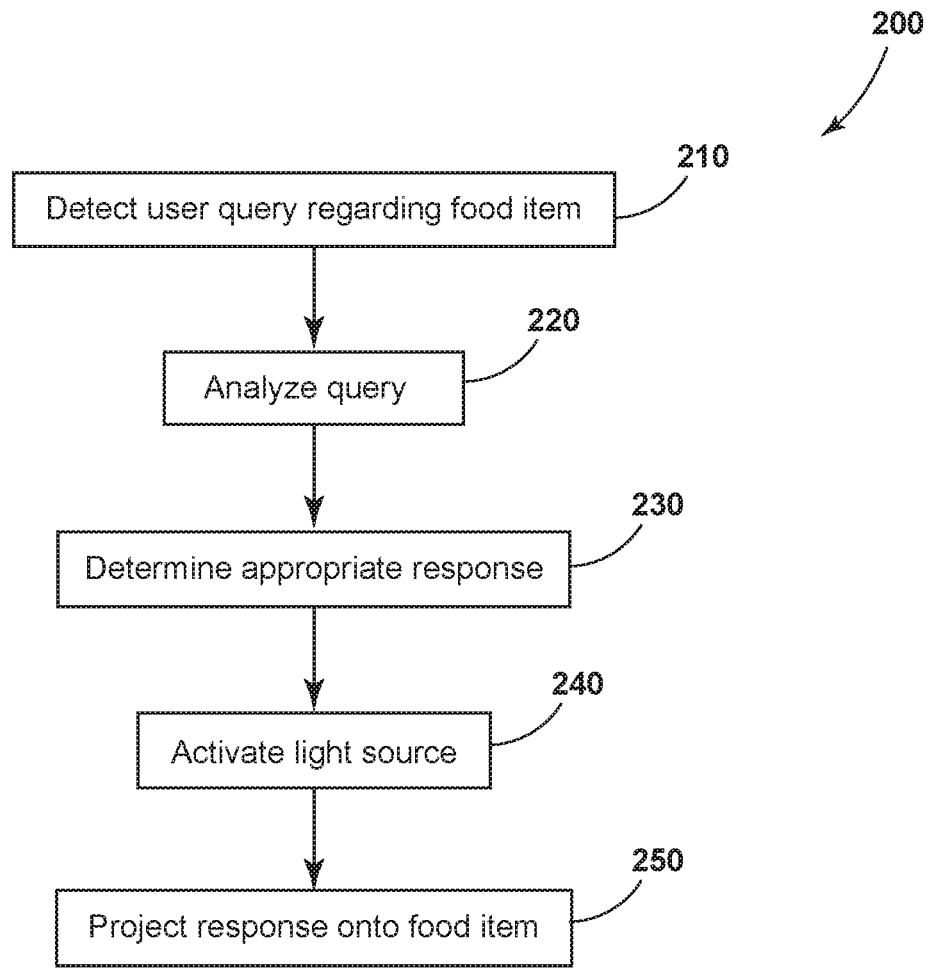
FIG. 8 is a flow chart demonstrating a process for a user querying the food storage system according to various aspects described herein.

FIG. 8 illustrates a flow chart demonstrating a process 200 wherein a user queries the system 10 in regards to a food item 24. The process 200 may begin at step 210 when the system 10 detects a user query regarding a food item. The user query can pertain to any food item property that can be detected or determined by the system 10 for the food item 24. At step 220, the controller 72 of the system 10 may analyze, or process, the query and then determine the appropriate response at step 230. The appropriate response at step 230 can include feedback to the user regarding the food item 24, which may include any suitable audio or visual techniques. At step 240, the controller 72 of the system 10 can initiate the response. Initiating the response can include activating the light source 28 (FIG. 1). Following the initiating of the response at step 240, the system 10 can provide the response and end the process 200 at step 250.

Providing the response can include projecting the response onto the food item 24.

Projecting the response onto the food item 24 can include any suitable lighting technique to provide an indication, including, but not limited to: words, icons, graphics, animations, light beams, diffused light, and coloration of light, and any combination thereof. For example, the projection 30 (FIG. 1) may include an expiration date. The expiration date can be in the form of colored pixels where the coloring may provide an indication if the expiration date has passed or not, such as green for not expired and red for expired.

While the method 200 is described as including steps 210-250, it is possible for the method 200 to include additional or fewer steps. Additional steps can include any suitable step or process as described herein. In some examples, the method 200 may include analyzing more than one query from the user and determining more than one response. Furthermore, initiating the response at step 240 may occur simultaneously with providing the response at step 250.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only.

Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A food storage system comprising:
    an appliance having a cabinet defining an interior, the interior comprising at least one of a shelf, a compartment, and a drawer configured to store at least one food item;
    a vision system comprising at least one imager configured to record image data related to the at least one food item stored within the interior; and
    a controller in communication with the vision system, wherein the controller is operable to:
        determine an identity and a physical storage location of the at least one food item;
        determine a storage configuration of the interior based on the image data from the vision system;
        determine heat profile data corresponding to a heat distribution of the interior;
        determine, based on the heat profile data and the determined identity of the at least one food item, a target storage location for the at least one food item;
        determine a compliance condition based on a comparison of the physical storage location to the target storage location;
        generate an augmented reality representation of the interior based on the determined identity of the at least one food item and the storage configuration of the interior;
        display the augmented reality representation; and
        wherein the augmented reality representation comprises a photographic representation of the interior with a digital representation of the at least one food item overlaid over a digital representation of the physical storage location in the photographic representation, and wherein the photographic representation of the interior includes a color indicator indicating the compliance condition overlaid over the digital representation of the at least one food item, and wherein the digital representation of the at least one food item is displayed as rendered graphics of the at least one food item.

2. The system according to claim 1, wherein determining the storage configuration of the interior comprises determining a relative position and a size of the at least one of a shelf, a compartment, and a drawer within the interior.

3. The system according to claim 1, wherein the controller is in communication with a display for at least one of a mobile device and the appliance and the augmented reality representation is displayed on the display.

4. A food storage system comprising:
    an appliance having a cabinet defining an interior, the interior comprising at least one of a shelf, a compartment, and a drawer configured to store at least one food item;
    a vision system comprising at least one imager configured to record image data related to the at least one food item stored within the interior;
    a lighting system comprising at least one light source configured to project a pattern of light; and
    a controller in communication with the vision system, wherein the controller is operable to:
        determine an identity of the at least one food item;
        determine a storage location for the at least one food item;
        determine heat profile data corresponding to a heat distribution of the interior;
        determine, based on the heat profile data and the determined identity of the at least one food item, a target storage location for the at least one food item;
        determine a compliance condition based on a comparison of the physical storage location to the target storage location; and
        control the lighting system based on the compliance condition.

5. The system according to claim 4, wherein the control of the lighting system includes projecting the pattern of light and varying a color of the pattern of light based on the compliance condition.

6. The system according to claim 4, wherein determining the target storage location is further based on a humidity data corresponding to a humidity profile of the interior.

7. A food storage system comprising:
an appliance having a cabinet defining an interior, the interior comprising at least one of a shelf, a compartment, and a drawer configured to store a plurality of food items, the plurality of food items including a first food item and a second food item;
a vision system comprising at least one imager configured to record image data related to the plurality of food items stored within the interior;
a lighting system comprising at least one light source configured to project a pattern of light; and
a controller in communication with the vision system, wherein the controller is operable to:
  determine an identity of the first food item;
  determine heat profile data corresponding to a heat distribution of the interior;
  generate a first instruction for the lighting system based on the heat profile data;
  communicate the first instruction to the lighting system to illuminate the interior via the pattern of light, wherein the pattern of light includes a variation of light color corresponding to the heat profile data;
  determine, based on the heat profile data and the determined identity of the at least one food item, at least one inferior storage location for the at least one food item;
  determine a physical storage location of the first food item based on the image data;
  update the at least one inferior storage location based on temperature data corresponding to a temperature of the second food item in the interior; and
  communicate a second instruction to the lighting system to modify the pattern of light to indicate the at least one inferior storage position.

8. The system according to claim 7, wherein the at least one inferior storage position includes a first inferior storage position and a second inferior storage, and wherein the controller is further operable to:
  determine an order of preference for each the first inferior storage position and the second inferior storage position based on the heat profile data; and
  communicate a third instruction to the lighting system to modify the variation of light color to indicate the first inferior storage position and the second inferior storage position.

* * * * *